(12) United States Patent
Brockelsby et al.

(10) Patent No.: US 11,593,303 B2
(45) Date of Patent: Feb. 28, 2023

(54) SYSTEMS AND METHODS FOR AUTOMATICALLY PLACING A FIRE SYSTEM DEVICE ICON ON A DRAWING OF A BUILDING FLOOR PLAN

(71) Applicant: Honeywell International Inc., Morris Plains, NJ (US)

(72) Inventors: Robert H. Brockelsby, La Grange, KY (US); Jacob Colyer, Louisville, KY (US)

(73) Assignee: Honeywell International Inc., Charlotte, NC (US)

( * ) Notice: Subject to any disclaimer, the term of this patent is extended or adjusted under 35 U.S.C. 154(b) by 50 days.

(21) Appl. No.: 16/238,761

(22) Filed: Jan. 3, 2019

(65) Prior Publication Data

US 2019/0278745 A1 Sep. 12, 2019

Related U.S. Application Data

(60) Provisional application No. 62/640,186, filed on Mar. 8, 2018.

(51) Int. Cl.
*G06F 16/14* (2019.01)
*G06F 40/205* (2020.01)

(52) U.S. Cl.
CPC .......... *G06F 16/148* (2019.01); *G06F 40/205* (2020.01)

(58) Field of Classification Search
CPC .... G06F 16/148; G06F 40/205; G06F 40/103; G06F 16/90344
See application file for complete search history.

(56) References Cited

U.S. PATENT DOCUMENTS

| 6,957,110 | B2 | 10/2005 | Wewalaarachchi et al. |
| 2011/0218777 | A1 | 9/2011 | Chen |
| 2013/0185024 | A1 | 7/2013 | Mahasenan et al. |
| 2016/0011751 | A1* | 1/2016 | Moses .................... G08B 25/14 715/769 |
| 2017/0315696 | A1* | 11/2017 | Jacobson ................. F24F 11/52 |
| 2018/0114430 | A1* | 4/2018 | Westmacott ........... G08B 25/14 |
| 2019/0212991 | A1* | 7/2019 | Ye ........................... G06F 30/13 |

FOREIGN PATENT DOCUMENTS

WO WO 2016/154321 A1 9/2016

OTHER PUBLICATIONS

Clarke, C. L., & Cormack, G. V. On the use of regular expressions for searching text. (1997), ACM Transactions on Programming Languages and Systems (TOPLAS), 19(3), 413-426. (Year: 1997).*

* cited by examiner

*Primary Examiner* — Tamara T Kyle
*Assistant Examiner* — Lana Alagic
(74) *Attorney, Agent, or Firm* — Brooks, Cameron & Huebsch, PLLC

(57) ABSTRACT

Systems and methods for automatically placing a fire system device icon on a drawing of a building floor plan are provided. Such systems and methods can include parsing a drawing file, searching the drawing file as parsed for a text string that matches known device address formats, storing the text string with coordinates corresponding to a location of the text string in the drawing file, retrieving a plurality of device addresses, matching the text string with one of the plurality of device addresses, and placing the fire system device icon for the one of the plurality of device addresses at the coordinates corresponding to the location of the text string in the drawing file.

17 Claims, 2 Drawing Sheets

SYSTEMS AND METHODS FOR AUTOMATICALLY PLACING A FIRE SYSTEM DEVICE ICON ON A DRAWING OF A BUILDING FLOOR PLAN

CROSS REFERENCE TO RELATED APPLICATIONS

This application claims priority to U.S. Provisional Patent Application No. 62/640,186 filed Mar. 8, 2018 and titled "SYSTEMS AND METHODS FOR AUTOMATICALLY PLACING A FIRE SYSTEM DEVICE ICON ON A DRAWING OF A BUILDING FLOOR PLAN." U.S. Provisional Patent Application No. 62/640,186 is hereby incorporated by reference.

FIELD

The present invention relates generally to fire systems. More particularly, the present invention relates to systems and methods for automatically placing a fire system device icon on a drawing of a building floor plan.

BACKGROUND

The ability to display a building floor plan with graphical representations of fire system devices, for example, fire system device icons for smoke detectors, pull stations, zones, and the like, has become a minimum-to-compete feature for fire building management systems and is becoming commonplace on fire panel displays. However, the process of configuring the fire system device icons on the building floor plan has historically been a manual process that can take many hours to perform and a significant amount of time to maintain.

Some systems and methods have been developed to automate placing the fire system device icons on the building floor plan, such as the systems and methods disclosed in U.S. Publication No. 2011/0218777. However, such systems and methods rely on graphical pattern matching and image processing pattern matching techniques, which can be unacceptably inaccurate.

In view of the above, there is a continuing, ongoing need for improved systems and methods.

DETAILED DESCRIPTION

Figure 1:
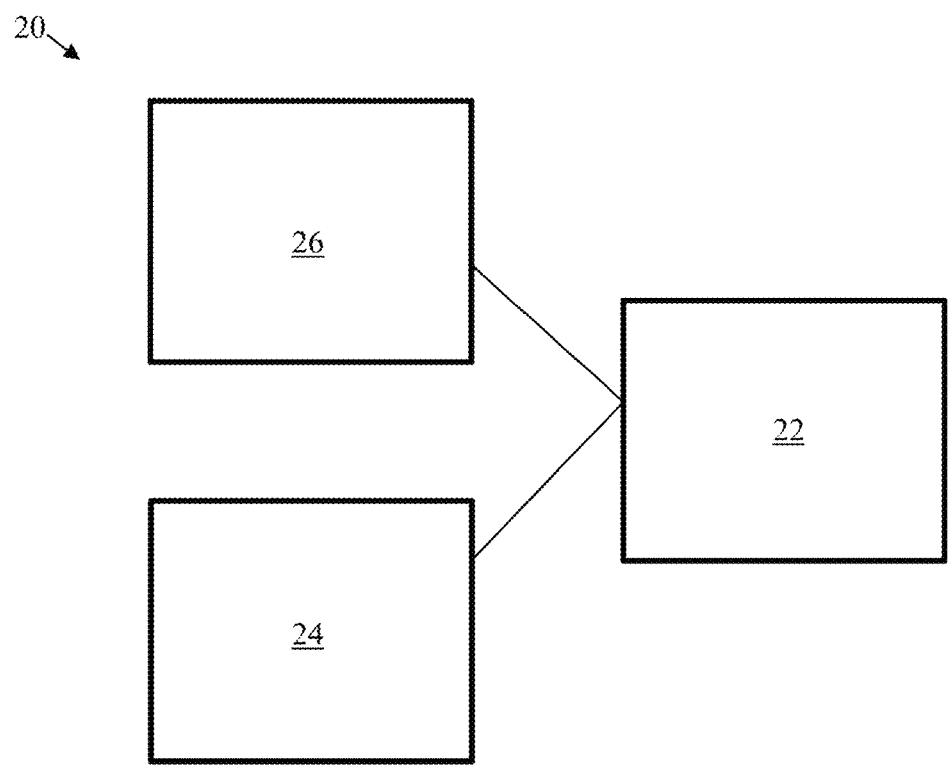
FIG. 1 is a block diagram of a system in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments disclosed herein can include systems and methods for automatically placing a fire system device icon on a drawing of a building floor plan, for example, a building information model (BIM). Some systems and methods disclosed herein can extract information from the BIM by using regular expression pattern matching to locate text in the BIM and match the text to a fire system device in configuration data of a fire panel. Advantageously, systems and methods disclosed herein can save many hours of labor as compared to known manual processes and can be more accurate than locating objects in the BIM using graphical pattern matching and image processing pattern matching techniques.

Systems and methods disclosed herein are described in connection with fire systems. However, it is to be understood that systems and methods disclosed herein are not so limited. Instead, systems and methods disclosed herein can be used in connection with placing icons for any device associated with a control panel of any system as would be known and desired by one of ordinary skill in the art.

In accordance with disclosed embodiments, systems and methods disclosed herein can identify a drawing file from a CAD package. For example, the drawing file can include the drawing of the building floor plan, such as the BIM. Systems and methods disclosed herein can also identify a plurality of device addresses from the fire panel. In some embodiments, systems and methods disclosed herein can identify the plurality of device addresses from a fire panel configuration database, and in some embodiments, systems and methods disclosed herein can identify the plurality of device addresses from the fire panel directly.

Regardless of the embodiment, systems and methods disclosed herein can parse the drawing file and use regular expressions to search the drawing file for text strings that match known forms of any of the plurality of device addresses. When systems and methods disclosed herein identify a matching text string in the drawing file, systems and methods disclosed herein can store the matching text string and coordinates of the matching text string in the drawing file.

When systems and methods disclosed herein complete parsing the drawing file, systems and methods disclosed herein can locate an equivalent one of the plurality of device addresses for each of the matching text strings identified. Then, systems and methods disclosed herein can use information from the fire panel and the coordinates of the matching text strings identified to place fire system device icons on the drawing representative of the drawing file.

FIG. 1 is a block diagram of a system 20 in accordance with disclosed embodiments. The system 20 can include a programmable device 22 coupled via a wired or wireless medium to a memory device 24 and a fire control panel 26. In some embodiments, the programmable device 22 can include a cloud server that is remote from the fire control panel 26 and that can communicate with the fire control panel 26 via a wide area network, such as the internet. Additionally or alternatively, in some embodiments, the programmable device 22 can be a part of the fire control panel 26. Additionally or alternatively, in some embodiments, the programmable device 22 can include a remote device (e.g. a computer, a mobile device, a tablet, a mobile phone, etc.) that can communicate with the fire control panel via a local network.

Figure 2:
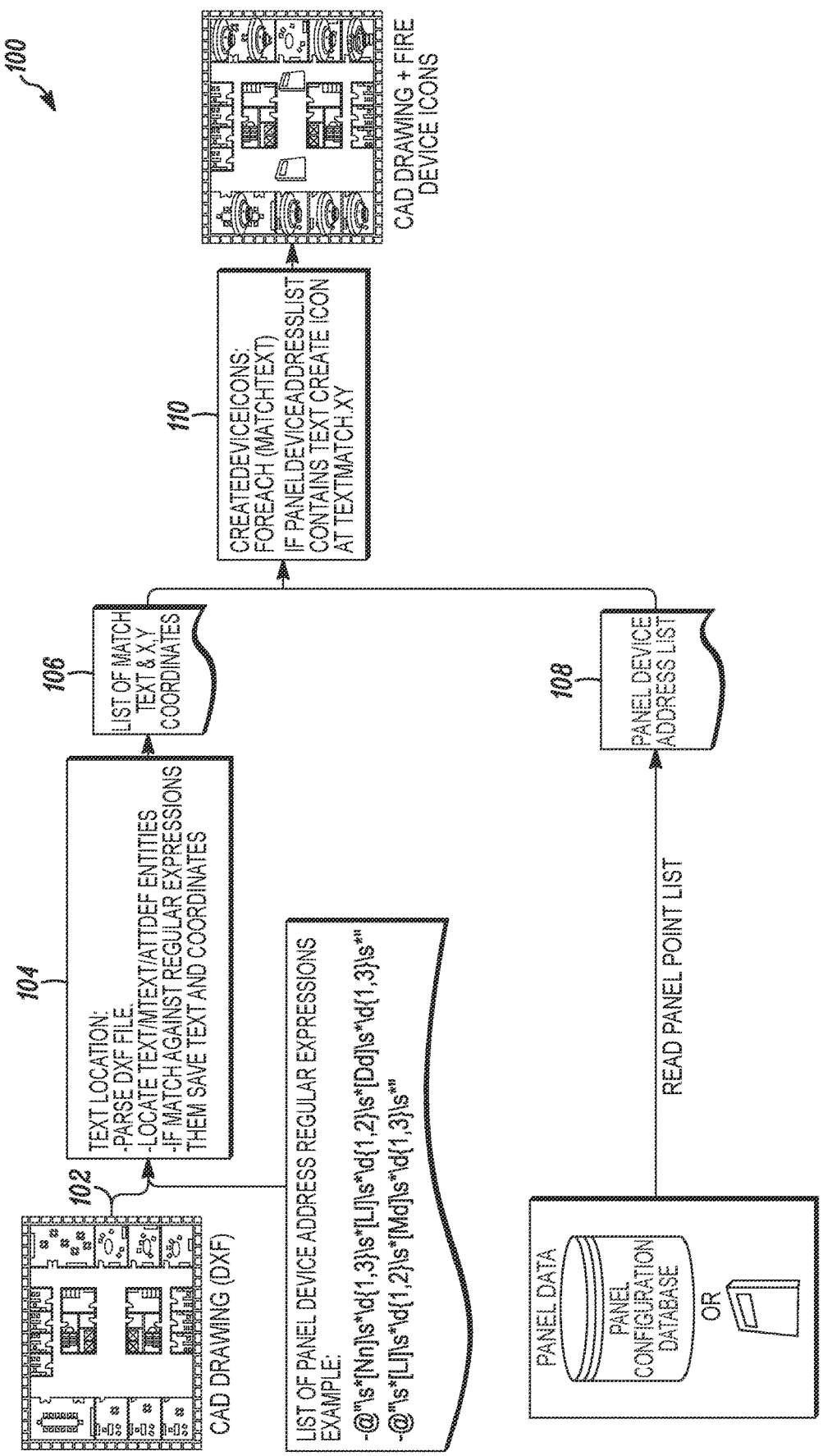
FIG. 2 is a flow diagram of a method in accordance with disclosed embodiments.

FIG. 2 is a flow diagram of a method 100 in accordance with disclosed embodiments. As seen in FIG. 2, the method 100 can include the programmable device 22 retrieving a drawing file and a list of known device address formats from the memory device 24, as in 102. In some embodiments, the list of known device address formats can be formatted as regular expressions. Then, the method 100 can include the programmable device 22 parsing the drawing file and searching the drawing file as parsed for at least one text string that matches any of the known of device address formats, as in 104, and, when identified, the programmable device 22 storing in the memory device the at least one text string with coordinates corresponding to a location of the at least one text string in the drawing file, as in 106. In some embodiments, the programmable device 22 can store the at least one text string and the coordinates in a list.

Previously, simultaneously, or subsequently, the method 100 can include the programmable device 22 retrieving a plurality of device addresses for devices associated with the fire control panel 26, as in 108. In some embodiments, the programmable device 22 can retrieve the plurality of device addresses from a panel configuration database of the fire control panel 26 storing panel configuration data. Additionally or alternatively, in some embodiments, the programmable device 22 can retrieve the plurality of device addresses directly from the fire control panel 26. Then, the method 100 can include the programmable device 22 matching the at least one text string stored in the memory device 24 with one of the plurality of device addresses and placing a fire system device icon for the one of the plurality of device addresses at the coordinates corresponding to the location of the at least one text string in the drawing file, as in 110.

It is to be understood that each of the programmable device 22, the memory device 24, and the fire control panel 26 as disclosed herein can include a respective transceiver device and a respective memory device, each of which can be in communication with respective control circuitry, one or more respective programmable processors, and respective executable control software as would be understood by one of ordinary skill in the art. In some embodiments, the respective executable control software of each of the programmable device 22, the memory device 24, and the fire control panel 26 can be stored on a transitory or non-transitory computer readable medium, including, but not limited to respective local computer memory, RAM, optical storage media, magnetic storage media, flash memory, and the like, and some or all of the respective control circuitry, the respective programmable processors, and the respective control software of each of the programmable device 22, the memory device 24, and the fire control panel 26 can execute and control at least some of the methods described herein.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   parsing a drawing file via a programmable device to identify multiple text strings therein, wherein the drawing file includes a building floor plan for a building in which a fire system is installed;
   comparing a selected one of the identified multiple drawing file text strings as parsed with multiple known device address format text strings stored in memory associated with the programmable device to identify a known device address format text string that matches the selected drawing file text string;
   determining a location, based on coordinate data within the drawing file, of a device identified by the selected drawing file text string;
   when a match is identified, storing the selected drawing file text string with the coordinate data corresponding to the location associated with the selected drawing file text string in the drawing file;
   retrieving a plurality of fire system device addresses from a fire control panel configuration database within a fire control panel at the building location where the fire system is installed;
   matching the selected drawing file text string with one of the plurality of fire system device addresses from the fire control panel configuration database; and
   placing a fire system device icon for the matched one of the plurality of fire system device addresses at the coordinates corresponding to the location of the selected drawing file text string in the drawing file, based on the match between the selected drawing file text string and the matched one of the plurality of fire system device addresses from the fire control panel configuration database.

2. The method of claim 1 further comprising retrieving the plurality of fire system device addresses from the fire control panel configuration database located on a server that is remote from a control panel.

3. The method of claim 1 further comprising identifying the drawing file from a computer aided drafting package.

4. The method of claim 1 wherein the building floor plan of the building includes a building information model.

5. The method of claim 1 further comprising using regular expressions to search the drawing file as parsed for the selected drawing file text string that matches the known device address format text strings.

6. The method of claim 1 further comprising storing the selected drawing file text string with the coordinates corresponding to the location of the selected drawing file text string in the drawing file in a list in a memory device.

7. A system comprising:
   a memory device storing a drawing file; and
   a programmable device that parses the drawing file device to identify multiple text strings therein, wherein the drawing file includes a building floor plan for a building in which a fire system is installed, compares a selected one of the identified multiple drawing file text strings as parsed with multiple known device address format text strings stored in memory associated with the programmable device to identify a known device address format text string that matches the selected drawing file text string, determines a location, based on coordinate data within the drawing file, of a device identified by the selected drawing file text string, when a match is identified, stores the selected drawing file text string with the coordinate data corresponding to the location associated with the selected drawing file text string in the drawing file in the memory device, retrieves a plurality of fire system device addresses from a fire control panel configuration database for devices associated with a fire control panel, matches the selected drawing file text string stored in the memory device with one of the plurality of fire system device addresses from the fire control panel configuration database, and places a fire system device icon for the one of the plurality of fire system device addresses at the coordinates corresponding to the location of the selected drawing file text string in the drawing file, based on the match between the selected drawing file text string and the matched one of the plurality of fire system device addresses from the fire control panel configuration database.

8. The system of claim 7 wherein the programmable device retrieves the plurality of fire system device addresses from a panel configuration database located on a server that is remote from the fire control panel.

9. The system of claim 7 wherein the programmable device identifies the drawing file from a computer aided drafting package stored in the memory device.

10. The system of claim 7 wherein the building floor plan of the building includes a building information model.

11. The system of claim 7 wherein the programmable device uses regular expressions to search the drawing file as parsed for the selected drawing file text string that matches the known device address format text strings.

12. The system of claim 7 wherein the programmable device stores the selected drawing file text string with the coordinates corresponding to the location of the selected drawing file text string in the drawing file in a list in the memory device.

13. The system of claim 7 wherein the programmable device includes a cloud server that is remote from the fire control panel.

14. The system of claim 7 wherein the programmable device is a part of the fire control panel.

15. The system of claim 7 wherein the programma ble device includes a remote device that is connected to the fire control panel via a local network.

16. The system of claim 15 wherein remote device includes one of a personal computer or a mobile device.

17. A control panel system comprising:
memory storing a drawing file and executable control software; and
a processor for executing the control software; and
wherein the executable control software parses the drawing file to identify multiple text strings therein, wherein the drawing file includes a building floor plan fora building in which a fire system is installed, compares a selected one of the identified multiple drawing file text strings as parsed with multiple known device address format text strings stored in memory associated with the programmable device to identify a known device address format text string that matches the selected drawing file text string, determines a location, based on coordinate data within the drawing file, of a device identified by the selected drawing file text string, when a match is identified, stores the selected drawing file text string with the coordinate data corresponding to the location associated with the selected drawing file text string in the drawing file in the memory device, retrieves a plurality of fire system device addresses from a fire control panel configuration database for devices associated with a fire control panel, matches the selected drawing file text string stored in the memory device with one of the plurality of fire system device addresses from the fire control panel configuration database, and places a fire system device icon for the one of the plurality of fire system device addresses at the coordinates corresponding to the location of the selected drawing file text string in the drawing file, based on the match between the selected drawing file text string and the matched one of the plurality of fire system device addresses from the fire control panel configuration database.

* * * * *